United States Patent
Kumar et al.

(10) Patent No.: US 9,904,473 B2
(45) Date of Patent: Feb. 27, 2018

(54) MEMORY AND PROCESSOR AFFINITY IN A DEDUPLICATED ENVIRONMENT

(71) Applicant: International Business Machines Corporation, Armonk, NY (US)

(72) Inventors: Keerthi B. Kumar, Bangalore (IN); Shailaja Mallya, Mangalore (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/946,990

(22) Filed: Nov. 20, 2015

(65) Prior Publication Data
US 2017/0147224 A1    May 25, 2017

(51) Int. Cl.
| | |
|---|---|
| G06F 3/06 | (2006.01) |
| G06F 12/12 | (2016.01) |
| G06F 12/122 | (2016.01) |
| G06F 9/00 | (2006.01) |
| G06F 11/14 | (2006.01) |
| G06F 17/30 | (2006.01) |

(52) U.S. Cl.
CPC ............ *G06F 3/0608* (2013.01); *G06F 3/065* (2013.01); *G06F 3/068* (2013.01); *G06F 3/0611* (2013.01); *G06F 3/0641* (2013.01); *G06F 9/00* (2013.01); *G06F 11/1453* (2013.01); *G06F 12/122* (2013.01); *G06F 17/30156* (2013.01)

(58) Field of Classification Search
CPC ............................ G06F 3/0641; G06F 3/0611
See application file for complete search history.

(56) References Cited

U.S. PATENT DOCUMENTS

| 8,909,845 B1* | 12/2014 | Sobel ................. G06F 9/45558 711/154 |
| 9,449,011 B1 | 9/2016 | Chen et al. |
| 2011/0125722 A1* | 5/2011 | Rao ..................... G06F 17/3015 707/693 |
| 2011/0191305 A1* | 8/2011 | Nakamura ............ G06F 3/0608 707/692 |

(Continued)

OTHER PUBLICATIONS

Ceron et al., "Power Systems Memory Deduplication," IBM, Redpaper, International Technical Support Organization, Feb. 2012, 100 pages, © Copyright International Business Machines Corporation 2012 http://www.redbooks.ibm.com/redpapers/pdfs/redp4827.pdf.

*Primary Examiner* — Edward Dudek, Jr.
*Assistant Examiner* — Ralph A Verderamo, III
(74) *Attorney, Agent, or Firm* — Joseph W. Cruz

(57) ABSTRACT

A page type may be identified for each of a plurality of memory pages, the page type corresponding to a particular process that accesses a particular memory page of the plurality of memory pages. The plurality of memory pages may each respectively include duplicate data. The duplicate data may be a same set of data values. Each of the plurality of respective memory pages may be ranked as candidates to deduplicate the set of data values to. The ranking may be based on at least the page type. In response to identifying the first processor and identifying a first memory device, the duplicate data may be deduplicated from the plurality of memory pages to a highest ranked memory page. The deduplication may correspond to coalescing the duplicate data to the highest ranked memory page.

20 Claims, 8 Drawing Sheets

(56) References Cited

U.S. PATENT DOCUMENTS

| | | | |
|---|---|---|---|
| 2013/0036100 A1* | 2/2013 | Nagpal | G06F 17/30156 707/692 |
| 2013/0151482 A1* | 6/2013 | Tofano | G06F 3/0641 707/692 |
| 2014/0189268 A1* | 7/2014 | Baldwin | G06F 3/0608 711/160 |
| 2014/0196033 A1 | 7/2014 | Bobroff et al. | |
| 2015/0006475 A1* | 1/2015 | Guo | G06F 17/30159 707/609 |
| 2015/0113232 A1 | 4/2015 | Kumar et al. | |
| 2015/0153961 A1 | 6/2015 | Satoyama et al. | |
| 2016/0267098 A1 | 9/2016 | Mallaiah et al. | |
| 2017/0147240 A1 | 5/2017 | Tsirkin et al. | |

\* cited by examiner

Before De-dup — 420

| Logical | Real | CKsum | Page type |
|---|---|---|---|
| M7 | RM7 | CK10 | User page |
| N3 | RN3 | CK10 | User page |
| O88 | R088 | CK10 | Kernel page |

After De-dup — 422

| Logical | Real | CKsum | Page type |
|---|---|---|---|
| M7 | R088 | CK10 | User page |
| N3 | R088 | CK10 | User page |
| O88 | R088 | CK10 | Kernel page |

FIG. 4B

MEMORY AND PROCESSOR AFFINITY IN A DEDUPLICATED ENVIRONMENT

BACKGROUND

This disclosure relates generally to memory page and process affinity, and more specifically, to memory and processor affinity in a deduplicated environment.

Deduplication (e.g., Active Memory Deduplication (AMD)), also known as memory page coalescing, is a virtual technology process that minimizes or eliminates identical memory pages in main memory. Accordingly, deduplication aggregates redundant data previously found in multiple memory addresses into one memory address, which frees up memory space for future data storage.

Deduplication may be utilized for partitions configured with shared memory. When running workloads on virtual Logical Partitions (LPARs), multiple identical data may be saved across various memory addresses in main memory. LPARs may be configured to share memory (e.g., Active Memory Sharing (AMS)). The goal of memory sharing is to share memory among multiple LPARs of a system and therefore increase server consolidation. However, when the aggregate memory size set for all of the LPARs exceed a shared pool size, disk I/O may occur (i.e., physical memory overcommitment). One way to minimize disk I/O is to reduce the amount or size of physical memory (e.g., Random Access Memory (RAM)) in use. Deduplication may achieve this goal by consolidating previously redundant data found in multiple address spaces into one memory address space.

SUMMARY

One or more embodiments are directed to a computer-implemented method, a system, and a computer program product for prioritizing data access within a deduplicated environment. A computing device may identify a page type for each memory page of a plurality of memory pages. The page type may correspond to a particular process that accesses a particular memory page of the plurality of memory pages. The plurality of memory pages may each respectively include duplicate data. The duplicate data may be a same set of data values. The computing device may include two or more processors. Each processor of the two or more processors may be directly attached to a different memory device. The computing device may rank each of the plurality of respective memory pages as candidates to deduplicate the set of data values to. The ranking may be based on at least the page type. The computing device may identify, based on the ranking, a first processor of the two or more processors that accesses a highest ranked memory page of the plurality of memory pages. The computing device may identify a first memory device that the memory page is located in. The first memory device may be directly attached to the first processor. In response to the identifying the first processor and the identifying the first memory device, the computing device may deduplicate the duplicate data from the plurality of memory pages to the highest ranked memory page. The deduplicating may correspond to coalescing the duplicate data to the highest ranked memory page.

BRIEF DESCRIPTION OF THE DRAWINGS

FIG. 4B is a diagram illustrating data structures mapping between logical and real pages before and after deduplication according to FIG. 4A.

Figure 1:
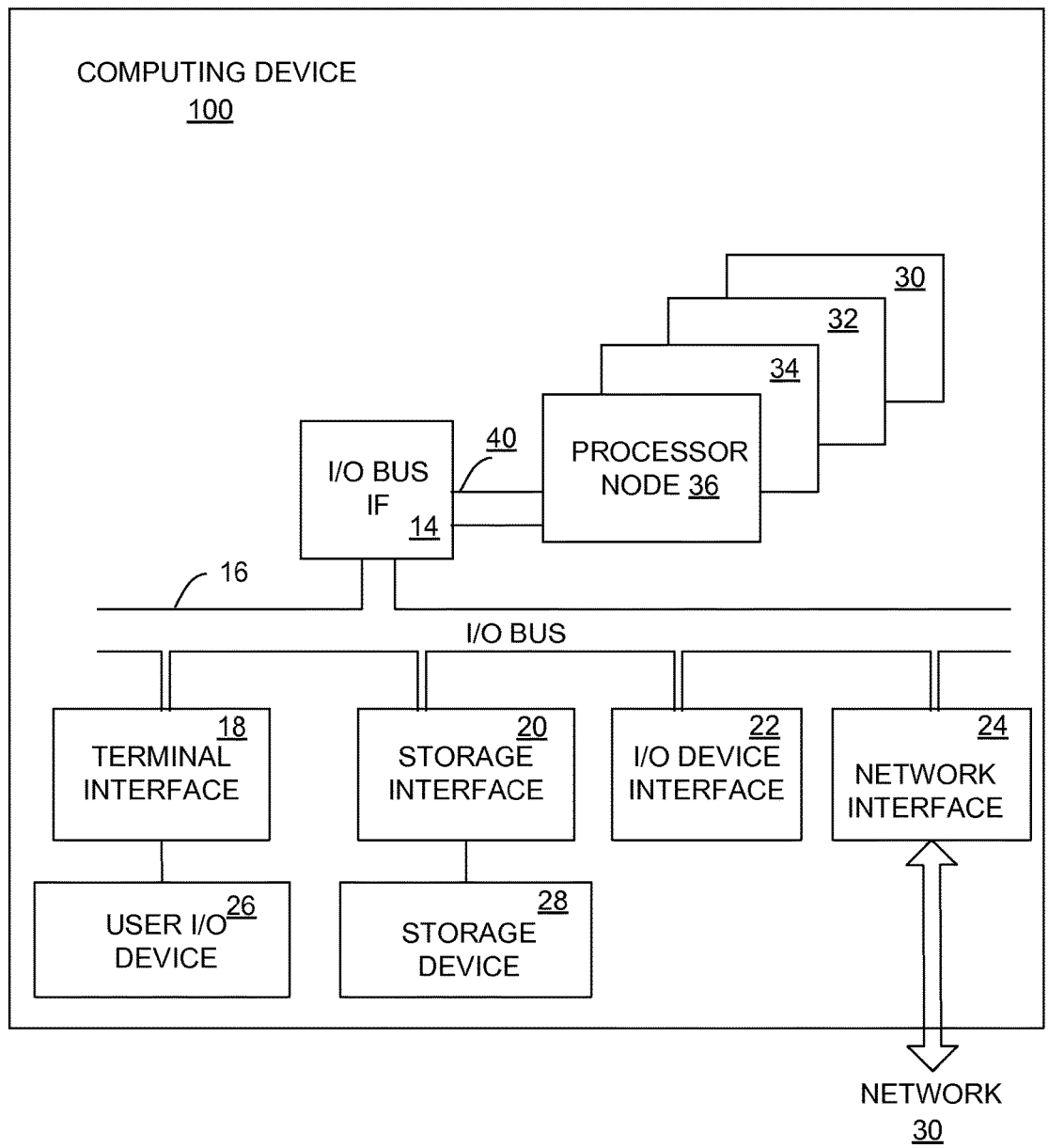
FIG. 1 is a block diagram of a computing device 100, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory and processor affinity in a deduplicated environment. While the present disclosure is not necessarily limited to such applications, various aspects of the disclosure may be appreciated through a discussion of various examples using this context.

Memory and/or processor affinity refers to keeping data within a particular memory page that is local to a processor for data access efficiency. For example, the main memory unit that includes the memory page (to which a set of data belongs to) and processor are within the same Scheduler Resource Affinity Domain (SRAD). Affinity may include changing a pointer position (or migrating) from memory pages that are attached to remote sockets (which are connected to processor units) to memory pages attached to sockets where a process is running. Typical memory affinity processes may occur when memory pages are frequently accessed by particular sockets. For example, a processor within a first socket may access a first memory page that is stored in memory that is local to a second remote socket. If the first socket accesses the first memory page more frequently than the second socket, a pointer position for the first memory page may be changed from a memory page of the second remote socket to a memory page that is local to the first socket. By keeping the data local to a processor performing a process, data access latency and overhead may be reduced because the processor communication does not have to travel to remote sockets and/or processor nodes.

Currently, in a deduplicated environment, memory and/or processor affinity may not be taken into consideration. However, even if memory and/or processor affinity was taken into consideration, some affinity processes (based on frequent page access) may not move a memory page local to a processor based on the critical or important process that is accessing that memory page. This failure of affinity processes to consider the importance of processes may lead to such processes accessing a remote memory page, which may result in the performance degradation of that process. For example, a real-time thread may be performing data access of a deduped (i.e., deduplicated) page that is residing remotely in a remote SRAD, as opposed to a local SRAD.

Compounding matters is the introduction of processor nodes (e.g., processor books) in multiple processor systems such as Non-uniform Access Memory (NUMA) architecture systems. There may be several processor books within a NUMA computing device. Each processor book may include several sockets, each connected to a processor chip, as well as memories, busses, and I/O connections. Each processor chip may include several processor cores. Consequently, when deduplication occurs in a NUMA system, deduplicated pages may be spread not only to various remote memory devices, but various processor books, which may make a thread running in one processor book experience even more than usual access latency when trying to access the deduplicated page from another processor book. Accordingly, embodiments of the present disclosure are directed to ranking memory pages based at least on a page type (e.g., kernel page versus a user application page) and deduplicating data to a memory page based on the ranking.

FIG. 1 is a block diagram of a computing device 100, according to embodiments. The components of the computing device 100 can include one or more processor nodes (e.g., processor nodes 30, 32, 34, or 36), a terminal interface 18, a storage interface 20, an Input/Output ("I/O") device interface 22, and a network interface 24, all of which are communicatively coupled, directly or indirectly, for inter-component communication via an inter processor node bus 10, an I/O bus 16, and an I/O bus interface unit 14.

In some embodiments, as illustrated in FIG. 1, the computing device 100 may include various processor nodes (e.g., processor node 36). Processor nodes may include various sockets of processors that are each attached to a main memory unit. Processor nodes are described in more detail below.

In some embodiments, the computing device 100 may include one or more general-purpose programmable central processing units (CPUs) or processor cores that are not a part of a processor node. In an embodiment, the computing device 100 may contain multiple processors; however, in another embodiment, the computing device 100 may alternatively be a single CPU device. Each processor executes instructions stored in memory.

The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The I/O bus interface unit 14 may further be coupled to one or more processor nodes via (e.g., the inter processor node bus 40), and each processor node may communicate with each other via the inter processor node bus 40.

In some embodiments, the computing device 100 includes a display system (not shown). The display system may include a display controller, a display memory, or both. The display controller may provide video, audio, or both types of data to a display device 02. The display memory may be a dedicated memory for buffering video data. The display system may be coupled with a display device, such as a standalone display screen, computer monitor, television, a tablet or handheld device display, or another other displayable device. In an embodiment, the display device may include one or more speakers for rendering audio. Alternatively, one or more speakers for rendering audio may be coupled with an I/O interface unit. In alternate embodiments, one or more functions provided by the display system may be on board an integrated circuit that also includes a processor.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 100, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory, or any portion thereof, may be stored to and retrieved from the storage device 28 as needed. The I/O device interface 22 provides an interface to any of various other I/O devices or devices of other types, such as printers or fax machines. The network interface 24 provides one or more communication paths from the computing device 100 to other digital devices and computer systems.

Although the computing device 100 shown in FIG. 1 illustrates a particular bus structure providing a direct communication path among the processor nodes (36, 34, 32, and 30), the I/O bus interface unit 14, the terminal interface 18, the user I/O device 26, the storage interface 20, the storage device 28, the I/O device interface 22, and/or the network interface 24, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 16 are shown as single respective units, the computing device 100, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In an embodiment, the computing device 100 is a Symmetric Multiprocessing System (SMP) system. In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

Figure 2:
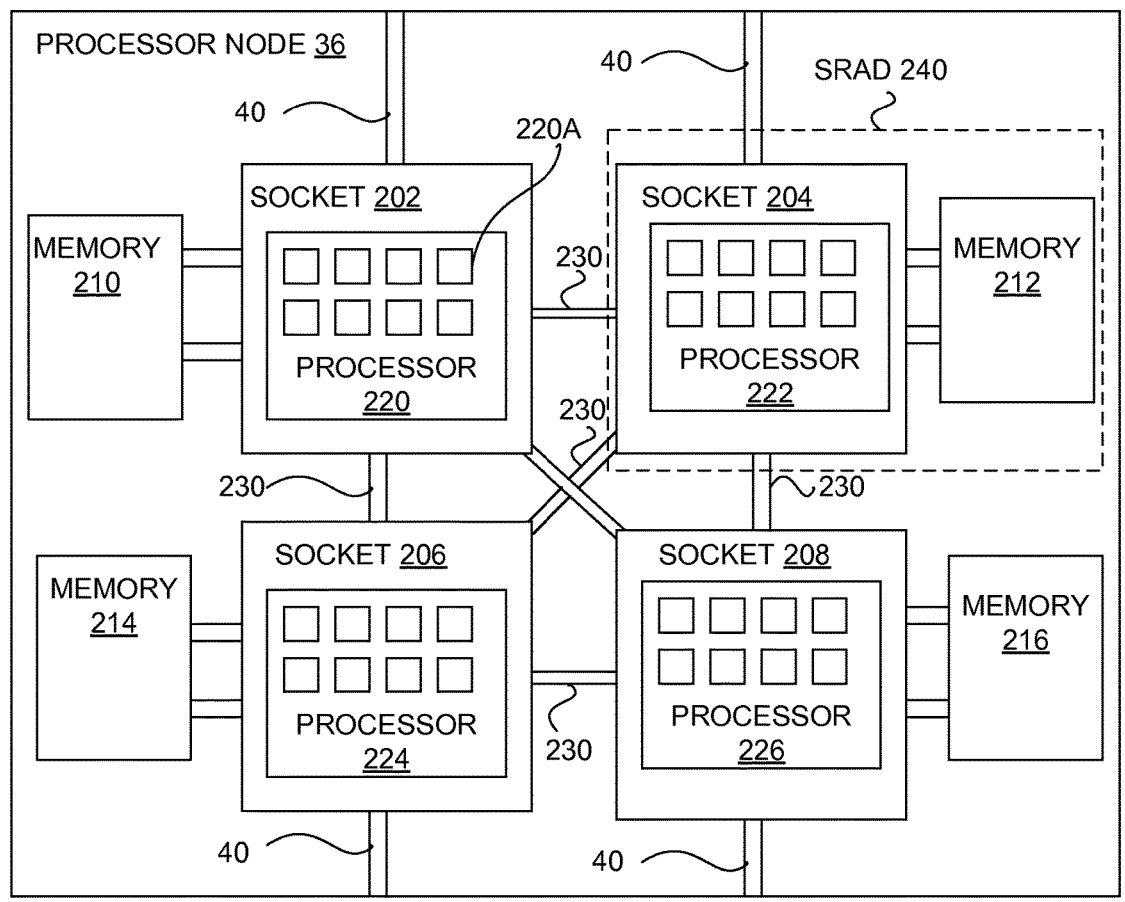
FIG. 2 is a block diagram of one of the processor nodes of FIG. 1, according to embodiments.

FIG. 2 is a block diagram of the processor node 36 of FIG. 1, according to embodiments. The processor node 36 may include one or more sockets, such as socket 202, socket 204, socket 206, and socket 208. A "socket" as described herein is a physical connector that (e.g., that may include leads, pins, pin receptacles, or contacts) that accepts a single physical chip (e.g., processor 220). The socket 202 may include processor 220 having various processor cores, such as processor core 220A. The memory 210 may be local (i.e., directly attached) to the processor 220. Further, socket 204 may be connected to the processor 222, which includes various processor cores. The memory 212 may be local to the processor 222. Likewise, the socket 206 may be connected to the processor 224 and the processor 224 may include various processor cores. The memory 214 may be local to the processor 224. Moreover, the socket 208 may be connected to the processor 226 and the processor 226 may include various processor cores. The memory 216 may be local to the processor 226.

Each of the processors within the processor node 36 may communicate with each other and/or the associated memories via the intraprocessor node bus 230. Each of the processors may also communicate with other processor nodes (e.g., processor node 34 of FIG. 1) via the interprocessor node bus 40.

In some embodiments, system managers (e.g., a hypervisor) may keep track of particular processors and their directly attached or local memories, which is known as a Scheduler Resource Affinity Domain (SRAD). An "SRAD" may be a logical identifier for a processor or group of processor cores and their directly attached or connected (i.e. local) memory device. For example, in FIG. 2, SRAD 240 may be logically grouped as the processor 222 and its attached memory 212 as a particular SRAD ID. An SRAD ID may be utilized by a system manager for determining a particular processor and/or memory affinity for a particular process, as described in more detail below.

In some embodiments, the processor node 36 is a processor book that is a part of a NUMA system configuration. A NUMA system configuration is a configuration with two or more processors, each processor being attached to a separate (i.e., different) memory device (e.g., Direct Random Access Memory (DRAM)), as opposed to a common bus or memory controller. NUMA systems, as opposed to distributed memory systems, are configured such that each processor may include mappings or have access to any memory unit regardless of whether the memory unit is local to a processor running a particular thread.

Figure 3:
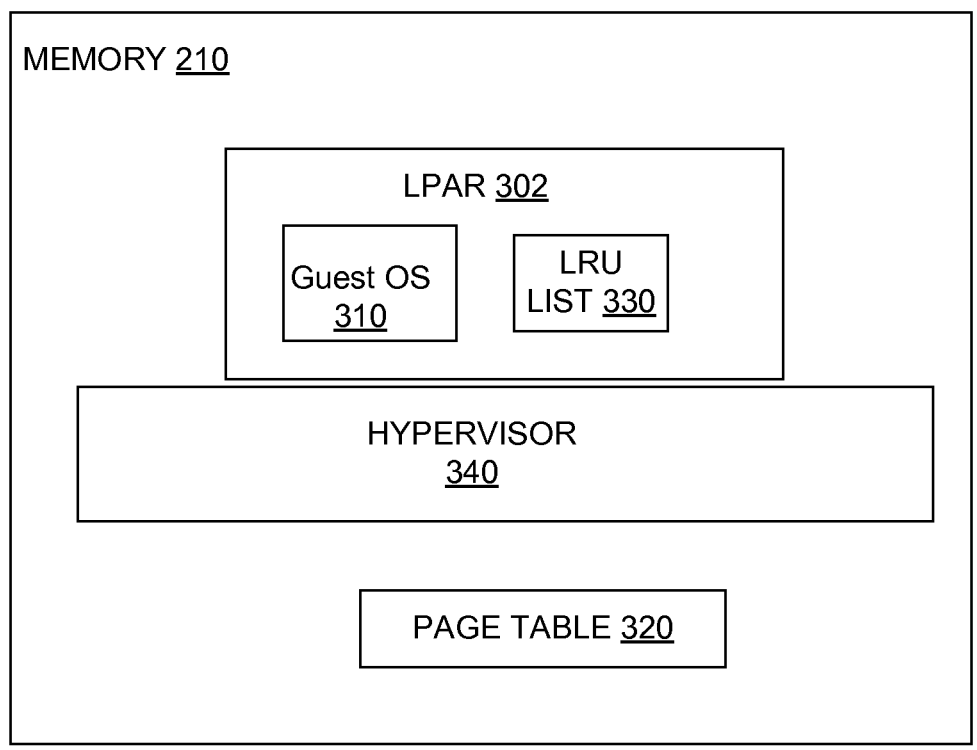
FIG. 3 is a block diagram of one of the memory units of FIG. 2, according to embodiments.

FIG. 3 is a block diagram of the memory 210 of FIG. 2, according to embodiments. In an embodiment, the memory 210 (or any of the other memory units illustrated in FIG. 2) may include a random-access semiconductor memory, storage device, or storage medium (either volatile or nonvolatile) for storing or encoding data and programs. In another embodiment, the memory 210 represents the entire virtual memory of the computing device 100, and may also include the virtual memory of other computer systems coupled to the computing device 100 or connected via a network 30. In some embodiments, the computing device 100 may only include a single memory unit, which may be a single monolithic entity, but in other embodiments, as illustrated in FIG. 2, there may be a hierarchy of caches and other memory devices. For example, memory may exist in multiple levels of caches, and these caches may be further divided by function, so that one cache holds instructions while another holds non-instruction data, which is used by the processor. Each of the memory units (e.g., memory 210, 212, 214, and 216) may be further distributed and associated with different CPUs or sets of CPUs, such as in the NUMA computer architectures.

The memory 210 may store all or a portion of the components and data responsible for processes performed as specified in more detail below. These programs and data are illustrated in FIG. 3 as being included within the memory 210 in the computing device 100; however, in other embodiments, some or all of them may be on different computer systems and may be accessed remotely, e.g., via a network 30. The computing device 100 may use virtual addressing mechanisms that allow the programs of the computing device 100 to behave as if they only have access to a large, single storage entity instead of access to multiple, smaller storage entities. Thus, while the components and data shown in FIG. 3 are illustrated as being included within the memory 210, these components and data are not necessarily all completely contained in the same storage device at the same time. For example, LPAR 302, page table 320, the Least Recently Used (LRU) list 330, and/or the hypervisor 340 may further be copied to the other memory units (e.g., memory 214). Although the components and data shown in FIG. 3 are illustrated as being separate entities, in other embodiments some of them, portions of some of them, or all of them may be packaged together.

In some embodiments, the memory 210 may include program instructions or modules, such as the LPAR 302, a hypervisor 340, and a page table 320. The LPAR 302 may include its own operating system (Guest Os 310) and an LRU list 330. An "LPAR" as disclosed herein may be a logical division of a computer's processors, memory and/or storage into multiple sets of resources such that each set of resources can be operated independently with its own operating system (e.g., Guest Os 310) and/or applications. In some embodiments, an LPAR is a Virtual Machine (VM). In some embodiments, an LPAR may be a container. A "container" is a virtual instance that may run only a portion of an operating system (e.g., at least a kernel), other applications, libraries, and/or system resources to run a particular program. Accordingly, a container may not be a "full" copy of an operating system and entire system image like a VM, but is a lighter virtual instance than a VM. A container may also run the same kernel as other virtual instances for a particular host but may optionally run a different distribution (e.g., other program applications). As disclosed herein, the term "set of" refers to one or more of (e.g., set of data is one or more units of data).

The page table 320 may store various mappings of virtual addresses (or logical addresses) to physical addresses as page table entries (PTEs). The memory 210 may also analogously include a segment table, which stores various mappings of effective (logical) address to virtual addresses. Instead of or in addition, a hypervisor logical memory map may be include in the memory 210 instead of or in addition to the page table 320, which is discussed in more detail below.

For each LPAR in a system, such as LPAR 302, a Least Recently Used (LRU) list 330 may be utilized by an LRU algorithm for page replacement. The LRU algorithm is based on that idea that pages that have been heavily used in the last few processes will likely be used again the next few processes. Conversely, pages that have not been used for a while will likely be unused for an extended period of time. Accordingly, the LRU algorithm is based on purging and/or paging out pages that have been unused for a long time when a page fault occurs. The LRU list 330 may include a list of all the pages in memory, with the most recently accessed page at the front and the least recently accessed page at the rear. After every memory access, a system manager (e.g., hypervisor) may update the list by moving the accessed page to the front of the LRU list 330.

In some embodiments, system hardware may utilize the LRU algorithm without utilizing the LRU list 330. For example, the computing device 100 may include a counter that is incremented after each instruction. Each page table entry may include a field that contains the counter value indicating how many times a particular page is referenced for data access. After each memory reference, the current value of the counter may be incremented and stored to the page table entry for the page just referenced. When a page fault occurs, the operating system (e.g. OS 310) examines all the counter values in the page table to find the page table entry for the lowest counter value. The page table entry for the lowest counter value corresponds to the page that is accessed the least and vice versa.

In some embodiments, system hardware may utilize the LRU algorithm by other hardware methods. For example, a system may include n page frames. The LRU hardware can maintain a matrix of n (´) within n bits that initially include all zero binary values. Whenever page frame k is referenced, the hardware sets all the bits of row k to 1, then sets all the bits of column k to 0. At any particular point in time, the row whose binary value is lowest is the least recently used. Alternatively, the row whose binary values is highest is the most recently used.

The hypervisor 340 may generate and manage each of the LPARs. In some embodiments, the hypervisor 340 is firmware or a dedicated hardware module (e.g., bare metal hypervisor). In other embodiments, the hypervisor 340, as illustrated in FIG. 3, is a program module (e.g., Type I hypervisor).

In an embodiment, the components and data shown in FIG. 3 (e.g., hypervisor 340) may include instructions or statements that execute on the processor or instructions or statements that are interpreted by instructions or statements that execute on the processor to carry out the functions as further described below. In another embodiment, the components shown in FIG. 1 may be implemented in hardware via semiconductor devices, chips, logical gates, circuits, circuit cards, and/or other physical hardware devices in lieu of, or in addition to, a processor-based system. In an embodiment, the components shown in FIG. 6 may include data in addition to instructions or statements.

FIG. 3 is intended to depict representative components of the computing device 100. Individual components, however, may have greater complexity than represented in FIG. 3. In FIG. 3, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 3 may be implemented, in various embodiments, in a number of different ways, including using various computer applications, routines, components, programs, objects, modules, data pages etc., which may be referred to herein as "software," "computer programs," or simply "programs."

Figure 4A:
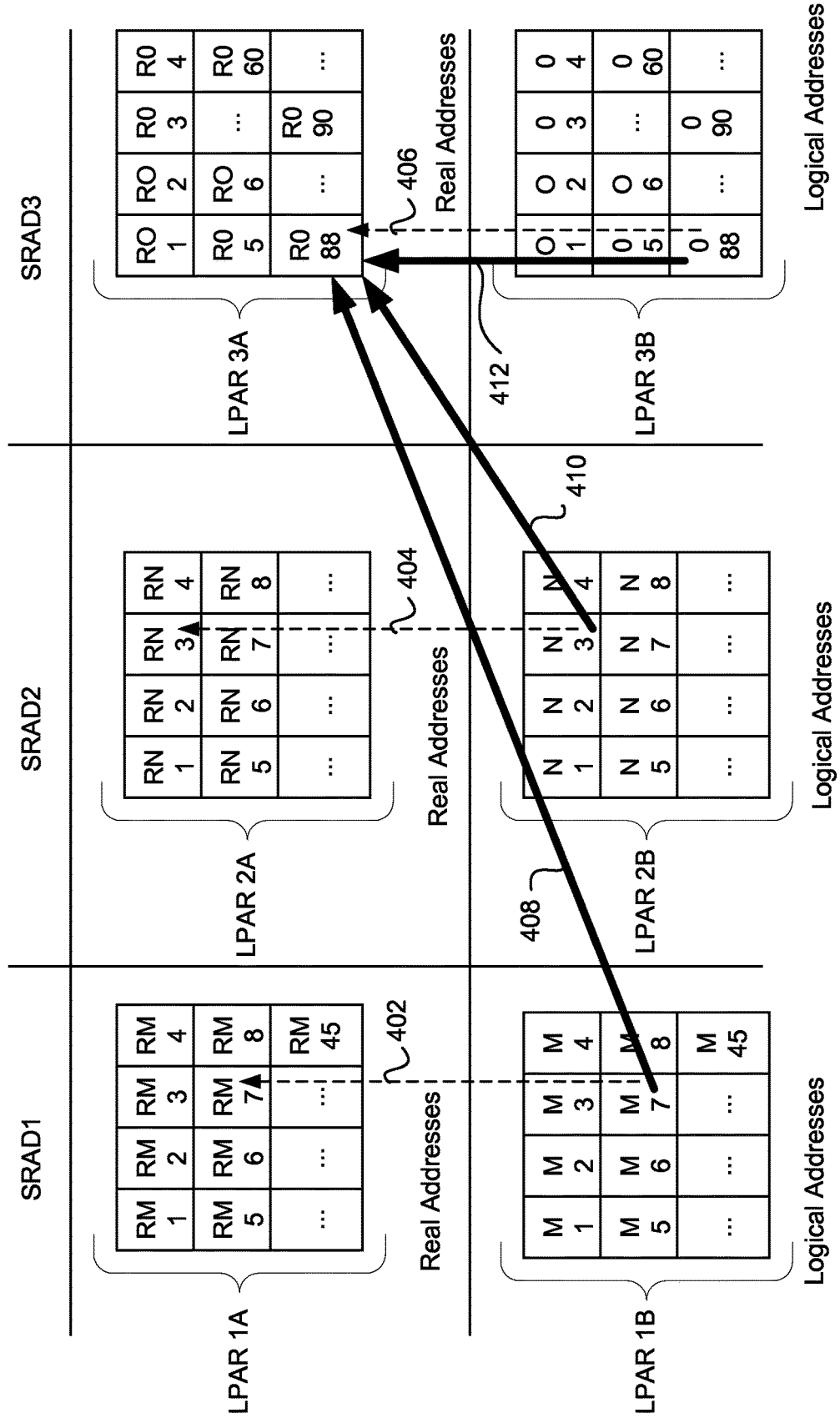
FIG. 4A is a block diagram illustrating deduplication of data from various addresses to a single address, according to embodiments.

FIG. 4A is a block diagram illustrating deduplication of data from various addresses to a single address, according to embodiments. An address is a space to which a particular unit of data is stored to. In some embodiments, an address may include a page (e.g., logical pages and real pages) and additional bits. As disclosed herein, an address and page may be used interchangeably for describing various embodiments. A page may be an address unit that includes one or more physical blocks for storing data. FIG. 4A illustrates three different SRADS—SRAD1, SRAD2, and SRAD3—and their associated LPARS—LPAR1, LPAR2, and LPAR3. SRAD1 includes a set of real addresses (LPAR1A) and a set of logical (e.g., effective) addresses (LPAR1B). SRAD2 also includes a set of real addresses (LPAR2A) and a set of logical addresses (LPAR2B). Further, SRAD3 includes a set of real addresses (LPAR3A) and a set of logical addresses (LPAR3B). FIG. 4A illustrates that for every physical SRAD or set of processors and the processor's directly attached memory, there may be a set of dedicated LPARs (e.g., virtual machines) that are represented by various real and logical addresses.

FIG. 4A illustrates what happens before deduplication (as represented by the dash-lined arrows—402, 404, and 406) and after deduplication (as represented by the thick-lined arrows—408, 410, and 412) for a given unit of data. For example, before deduplication, FIG. 4A illustrates that a first unit of data within the SRAD1 may be mapped from logical page M7 (within LPAR1B) to the real page RM7 (within LPAR1A), as indicated by the arrow 402. Likewise, for the same first unit of data in SRAD2, logical page N3 may be mapped to the real page RN3, as illustrated by the arrow 404. Further, the logical page O88 may be mapped to the real page R088, as illustrated by the arrow 406. After deduplication, the first unit of data within the SRAD1 may be mapped from the logical page M7 to the real page R088, which is within SRAD3 (as indicated by the arrow 408). Accordingly, a pointer value for the first set of data may be changed from where the first set of data was stored before deduplication (RM7) to the chosen deduplication address R088. In some embodiments, the first set of data may be migrated from RM7 to R088. Likewise, the first set of data within SRAD2 may be mapped from logical page N3 to R088, as illustrated by the arrow 410. Further, the first set of data within SRAD3 may not change its mapping from before deduplication to after deduplication. Accordingly, the first set of data may continue to be mapped from logical page O88 to physical page R088, as illustrated by the arrow 412.

FIG. 4B illustrates, in table form, what happens before deduplication and after deduplication according to FIG. 4A. In some embodiments, each of the tables 420 and 422 represents a data structure (e.g., hypervisor logical memory map, which includes a mapping between LPAR memory pages and physical pages) that a hypervisor may utilize to determine which pages are duplicates (i.e., the same) and where to change a mapping for a unit of data for affinity purposes. The tables 420 and 422 may be illustrative of the deduplication operation that occurred in FIG. 4A. Each of the tables 420 and 422 includes a "logical" address field, a "real" address field, a CKsum (i.e., checksum) field, and a "page type" field. In some embodiments for address translation, addresses may be translated from an effective address to a virtual address, and from a virtual address to a real address. Accordingly, pointers for a given segment table entry (STE) or page table entry (PTE) may be stored in an STE or PTE in order to map an effective address to a virtual address or a virtual address to a real address respectively. In some embodiments, every time an LPAR requests a memory page, logical addresses may be directly translated to a corresponding physical memory page. In these embodiments, a pointer for a given entry may be stored in a hypervisor logical memory map in order to map a logical address to a real address.

A checksum is a set of bit values that are utilized to identify data content for deduplication purposes. In some embodiments, if a checksum value is the same for two or memory addresses, then the data within the memory addresses are considered to be the same or duplicate. And if the memory addresses are duplicate, then each of the memory addresses may be deduplicated, as discussed above. The "page type" field may indicate the type of process or thread that accesses a particular memory page of an address. For example, one page type may be a user page. A "user page" may be a user application page, which may include any portion of a program, excluding a kernel. Accordingly, a particular thread corresponding to a particular processor may access a user application page. Another type of page is a "kernel" page, which is a page that is accessed from a process that runs a kernel (or portion of a kernel) of an operating system. A kernel may be a core or central portion of an operating system that provides services for all other parts of an operating system. The kernel may include an interrupt handler that manages all requests or completed I/O operations that need the kernel's services. The kernel may also include a scheduler that determines which programs share the kernel's processing time and in what order. The kernel may also include a supervisor that allocates use of a computing device to each process when it is scheduled. Another type of page is a "real-time" page, which is a page that is accessed by a process for real-time or near real time data access. "Real-time" may mean data that is accessed and processed immediately after or substantially close to an event or input (e.g., sensor read, etc.). For example, a computing device may update information at substantially the same time as it receives information. An "active" page (e.g., working segment page) may correspond to a process or thread that is currently running on a processor, as opposed to an inactive page, in which no process or thread is currently running on a processor.

Each page type may take on different priorities for determining what to change pointer values to (mapping for address translation) for deduplication and affinity purposes. For example, a kernel page may take on a higher priority than a user page because a kernel page may frequently be accessed compared to a user page. Accordingly, a pointer value for data may be changed from a remote memory page to a local memory page that is attached to a processor performing the data access for the kernel page. Likewise, a real-time page may take on a higher priority than a user page because efficient real-time data access may depend on reducing data access latency, and a way to reduce the access latency may be to change a pointer value or maintain the data within an address of memory that is locally attached to the process calling for that real-time data. In some embodiments, the hypervisor may store a ranking of page type for affinity purposes in a deduplicated environment. For example, a highest ranked page type may be a real-time data page, a second highest ranked page type may be a kernel page, and a last ranked page type may include a user page. Accordingly, because the real-time page type is ranked first, the hypervisor may first determine whether any active processes are real-time processes, and if so, the hypervisor may change a mapping for each of the duplicate data from a remote memory unit to a local memory unit that is attached to processor responsible for the real-time data access.

Table 420 in FIG. 4B illustrates that before deduplication, each of the entries (rows) have the same checksum value of 10, which means that the corresponding page numbers include the same data values that need to be deduplicated. The table 420 (and FIG. 4A) also illustrates that logical page M7 is mapped to real page RM7, and is part of a process that utilizes a user page. Further, logical page N3 may be mapped to the real page RN3, and may also be part of a process that utilizes a user page. Moreover, logical page 088 may be mapped to real page R088, but may be part of a process that utilizes a kernel page.

After deduplication, the table 422 (and FIG. 4A) illustrates that the logical page M7 now maps to the real page R088, instead of RM7. The logical page N3 now maps to the real page R088 instead of RN3. Likewise, the logical page 088 maps to the same real page R088. Accordingly, after deduplication, each of the logical pages now map to the same real page—R088. Therefore, if a set of data is requested for various LPARs, that set of data will be located at only one address space, as opposed to two or more. If the kernel page type is ranked the highest or higher than the user page type, the hypervisor may consolidate the redundant data to real page R088 (by changing mapping values) in order to bring the data access closer to the processor accessing the data. For example, referring back to FIG. 4A, SRAD3 may include the process that is accessing the highest ranked page type—the kernel page. Accordingly, a pointer or mapping value for the redundant data found in the real addresses RM7 and RN3 may be changed to R088 because R088 is included in SRAD3's associated LPAR (LPAR3). By consolidating the data within real page R088, which is located in a memory local to the processor utilizing the kernel page, data access latency may be reduced, as the processor does not have to travel to remote processor nodes or sockets. Alternatively, for example, if the processor that was part of a kernel page access was located in SRAD3 but a mapping for the data was changed to real page RM7, then the data communication for access would have to occur from SRAD3 to SRAD1, which may require signals traveling through more system buses, especially if SRAD3 and SRAD1 were located within different processor books.

Figure 5:
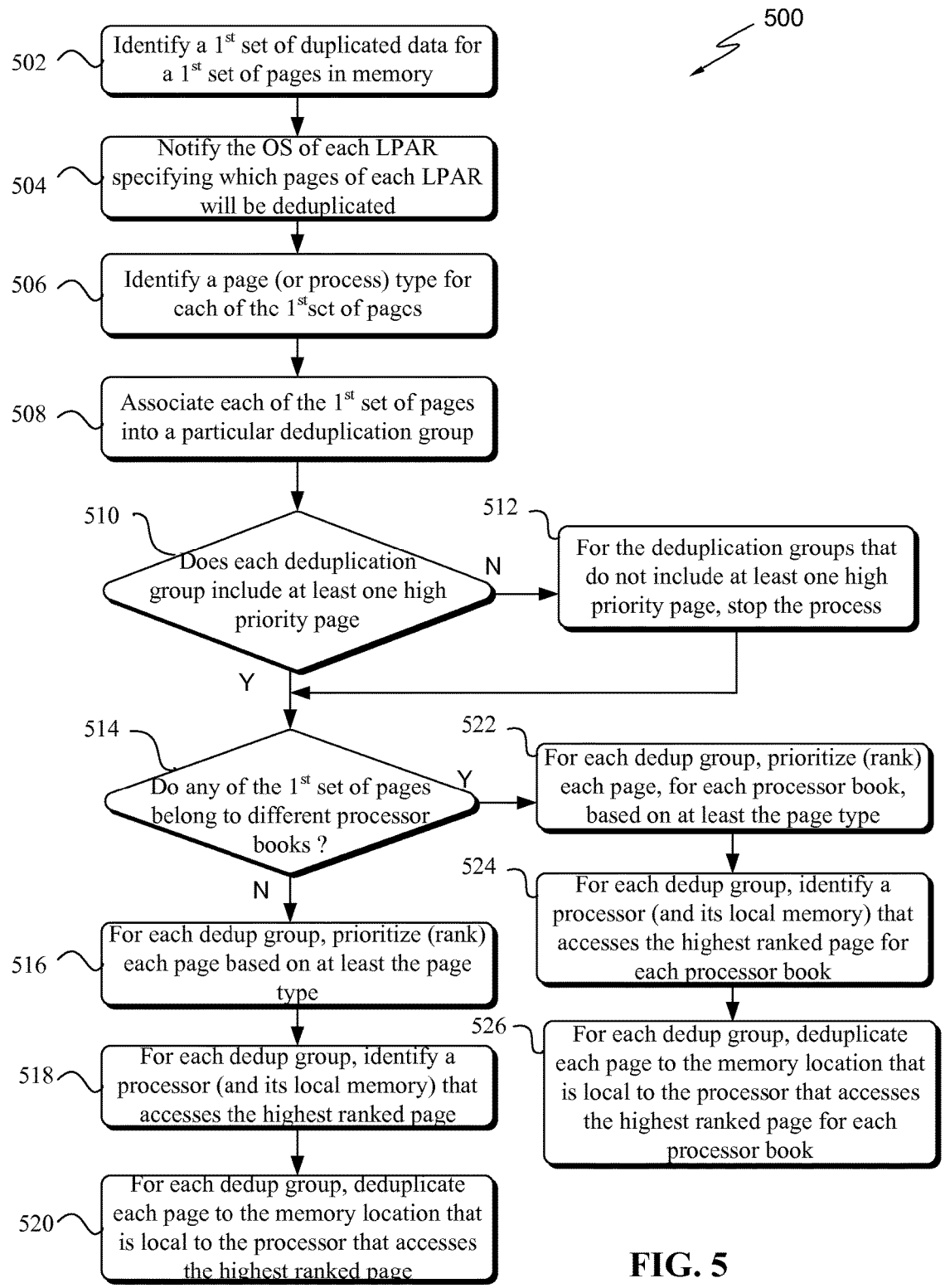
FIG. 5 is a flow diagram of a process for deduplicating a set of values according to a page rank, consistent with embodiments.

FIG. 5 is a flow diagram of a process for deduplicating a set of values according to a page rank, consistent with embodiments. In some embodiments, the process 500 begins at block 502 when a hypervisor identifies a first set (i.e., one or more) of duplicated (i.e., the same, redundant, etc.) data within a first set of pages or addresses in memory. In some embodiments, a hypervisor may find duplicated data by scanning the entire physical memory and comparing the data. When the hypervisor scans a particular page, the hypervisor may generate a signature for the physical page and save the signature to a deduplication table. A deduplication table may be a data structure that includes the signature from the hypervisor scan and signatures obtained from a hypervisor memory map. If a page signature is calculated and the calculated signature matches the signature of another page in the deduplication table, both pages may contain the same data. The two pages are then compared to verify that the data is identical. If both pages contain the exact same data, then the pages are duplicated, meaning one of the pages is freed up in physical memory and a logical-to-physical memory map for the freed-up page is updated so that the logical address that previously pointed to the freed-up page points to the physical address of the page remaining in physical memory. In some embodiments, identifying a first set of duplicated data may be time-based. For example, at particular time thresholds (e.g., every hour) the hypervisor may determine and identify whether there are any new duplicate data. In some embodiments, identifying a first set of duplicated data may be count-based. For example, for a first quantity of addresses (e.g., addresses 1-100), the hypervisor may determine whether there are duplicated data. For a second quantity of addresses (e.g., 101-200), the hypervisor may determine whether there are duplicated data.

Per block 504, and in some embodiments, the hypervisor may then notify the operating system of each LPAR and the notification may specify which pages of each LPAR will be deduplicated. For example, referring back to FIG. 3, the hypervisor may notify guest OS 310 within LPAR 302 and specify that 10 duplicate pages were found within LPAR 302 and therefore the data within the 10 pages will need to be deduplicated to a single page. The hypervisor may notify each of the other operating systems in a similar manner.

Per block 506, the hypervisor may identify a page type for each of the first set of pages. A page type may correspond to a particular process that accesses a particular page (e.g., real time thread, kernel thread, user page thread, etc.). In some embodiments, this may occur when each operating system (e.g., guest OS 310) responds to the hypervisor from the notification specified in block 504 and communicates to the hypervisor the page type (e.g., kernel page, real time page, user page, etc.) for that operating system's corresponding pages that need to be deduplicated. In some embodiments, each operating system may identify a page type by utilizing a process ID field within a page table, as discussed in more detail below. In some embodiments, a hypervisor or operating system may use a table analogous to tables 422 and/or 422 of FIG. 4 to identify the page type, as discussed above.

Per block 508, the hypervisor may associate (or organize) each of the first set of pages into a particular deduplication group. A deduplication group may be a group that includes the same checksum values. If a portion of the first set of pages includes the same checksum value, then that means the portion of the first set of pages includes the exact same data. Accordingly, block 508 may be a result of the hypervisor organizing identical duplicated data into groups. For example, before block 508, the hypervisor may receive notification from a first operating system that LPAR1 includes a user page M7 and a kernel page M45. A second operating system may notify the hypervisor that LPAR2 includes a user page N3, another user page N6, and a kernel page N7. A third operating system may notify the hypervisor that LPAR3 includes a kernel page 088, a user page 090, and a kernel page 060. After the hypervisor receives these notifications, the hypervisor may, per block 508, determine that the three physical pages that M7 from LPAR1, N3 from LPAR2, and 088 from LPAR3 are mapped to all contain the exact same data and may therefore be grouped accordingly (e.g., deduplication group 1).

Per block 510, the hypervisor may determine whether each deduplication group includes at least one high priority page. This determination, in some embodiments, may be based on scoring each page for priority, as described in FIG. 6 below. Block 510 may be performed because if there is not at least one high priority page, then there may be no need to rank pages and therefore dedup data to a particular memory page. Although deduplication may still occur, if a particular deduplication group includes low priority or non-important pages, then the chosen page to which deduplication occurs may not matter. Accordingly, per block 512, for the deduplication groups that do not include at least one high priority page, then the process 500 may end. But for the deduplication groups that include at least one high priority page, then the process 500 may continue.

Per block 514, for those deduplication groups that include at least one high priority page, then the hypervisor may determine whether any of the first set of pages belong to different processor books. For example, as discussed in FIG. 4A, a particular address may be located within a particular SRAD (e.g., SRAD1 includes LPAR1 address RM7). Furthermore, each SRAD may be located within a different processor book (e.g., as illustrated in FIGS. 1 and 2). In some embodiments, the hypervisor may determine whether any of the first set of pages belong to different processor books by first obtaining an SRAD ID for a page. The hypervisor may do this by taking a page frame number (RPN) (e.g., one of the first set of pages) of a first address to obtain a frame set to which the data belongs to. From the frame set, the hypervisor may obtain the memory pool (e.g., quantity of memory blocks that are the same sizes) that the frame set belongs to. From the memory pool, the hypervisor may obtain which virtual memory pool (VMpool) the memory pool belongs to. A VM pool is the aggregated physical computer hardware (e.g., CPU, memory, and other components) allocated to virtual machines (VMs) in a VMware virtual infrastructure. The VM pool may be the SRAD ID. The hypervisor may store or have access to a list that includes an ID for each processor book and what VM pool or SRAD ID is included in a particular processor book.

Per block 516, if none of the first set of pages belong to a different processor book, then for each deduplication group, the hypervisor may prioritize and rank each page based on at least the page type. For example, as discussed above, the hypervisor may identify that the first page to which a kernel thread accesses is a kernel page. The hypervisor may also identify that a second page to which a user thread accesses is a user page. Accordingly, the kernel page may have a higher priority and therefore be ranked higher. Ranking and prioritizing are discussed in more detail below. In some embodiments, the ranking of pages may be based off of more factors, as discussed in more detail below.

Per block 518, for each deduplication group the hypervisor may identify a processor (and its local memory) that accesses the highest ranked page. For example, the hypervisor may identify the SRAD of the highest ranked page. In some embodiments, the hypervisor may first determine which page for each deduplication group is the highest ranked. The hypervisor may then associate the highest ranked page with a particular SRAD. As discussed above, the hypervisor may identify a particular SRAD for a given page by taking a page frame number (RPN) of a first address to obtain a frame set to which the data belongs to. From the frame set, the hypervisor may obtain the memory pool that the frame set belongs to. From the memory pool, the hypervisor may obtain which virtual memory pool (VMpool) the memory pool belongs to. The VMpool may be the SRAD ID that corresponds with a particular page.

Per block 520, for each deduplication group, the hypervisor performs a deduplication process in which the page that stores data is retained in a physical memory that is local to the processor that accesses a logical page having the highest ranked page and the logical pages of other pages in the deduplication grouped are mapped to the page local to the processor accessing the highest ranked page. Accordingly, as discussed above, for each deduplication group, the hypervisor may change a mapping for a value (e.g., change a pointer value) to an LPAR address that belongs to the SRAD of the process accessing the highest ranked page. For example, a first processor may be running a first real-time thread to access a first set of data located in a first logical page. The first logical page may therefore be a real-time page and be ranked the highest page when compared to all of the other logical pages within a particular deduplication group. Accordingly, a first physical page local to the first processor may store the data and all other logical pages in the deduplication group that are not ranked the highest may be mapped to the first physical page such that no redundant data exists within any of the other physical memory pages.

Per block 522, if any of the first set of pages belong to different processor books, for each deduplication group, the hypervisor may prioritize and rank each page, for each processor book, based on at least the page type. Per block 524, for each deduplication group, the hypervisor may then identify a processor and its local memory (e.g., an SRAD) that accesses the highest ranked page for each processor book. Per block 526, for each deduplication group, the hypervisor may deduplicate each page to the memory location that is local to the processor that accesses the highest ranked page for each processor book.

Figure 6:
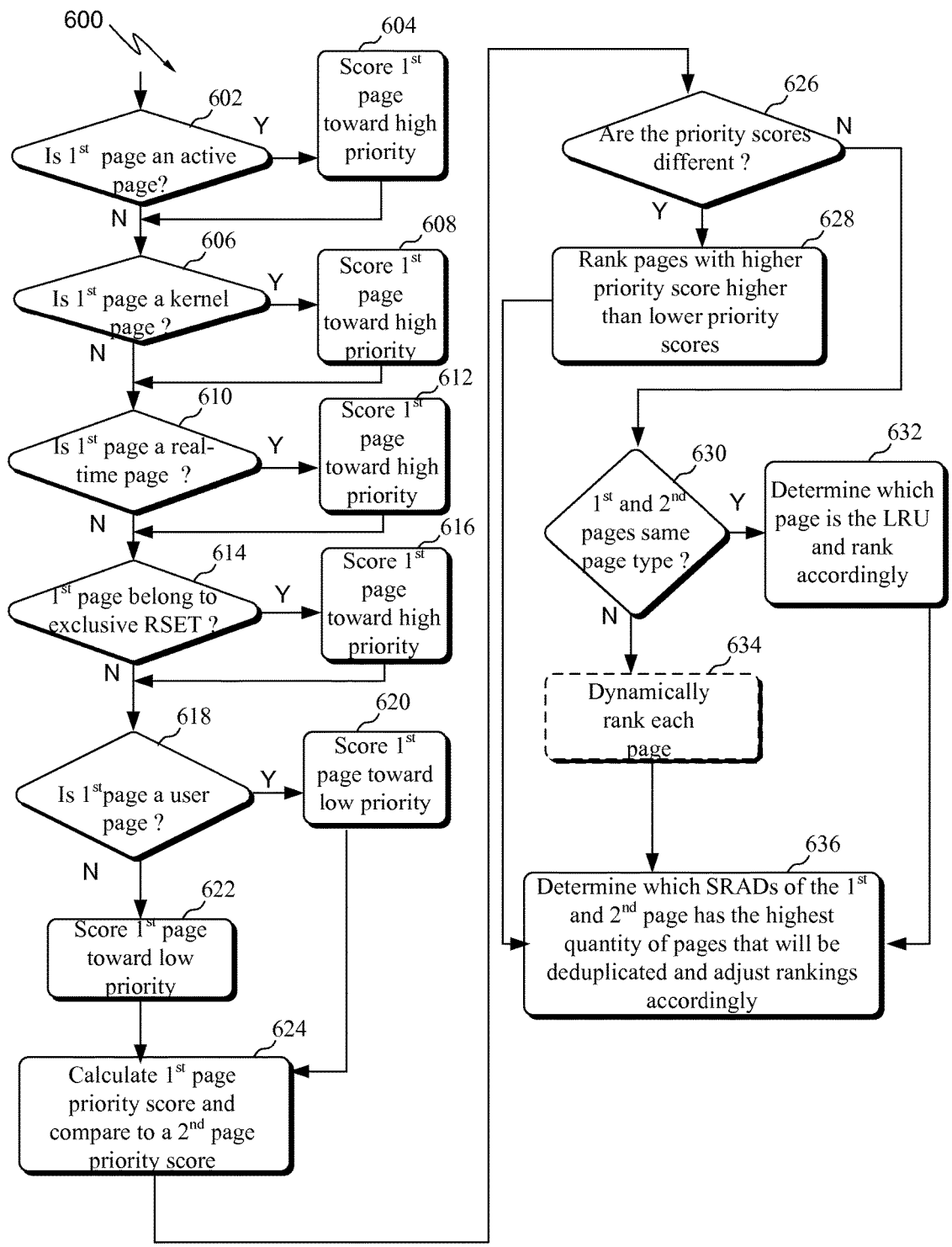
FIG. 6 is a flow diagram of an example process for prioritizing and ranking each page, according to embodiments.

FIG. 6 is a flow diagram of an example process for prioritizing and ranking each page, according to embodiments. Although the process 600 includes various ways for prioritizing and ranking two pages against one another, more than two pages may be prioritized and ranked and more or less blocks may be present than illustrated. Further, the order of blocks illustrated in FIG. 6 is not necessarily the order in which process 600 must occur. For example block 614 may occur before block 610, block 610 may occur before block 606, and block 606 may occur before block 602. Accordingly, the process 600 is utilized for illustrative purposes.

In some embodiments, the process 600 may begin at block 602 when an operating system or hypervisor determines whether a particular first page is an active page. As discussed above, one way to determine a page type is when each operating system communicates to the hypervisor the page type (e.g., kernel page, real time page, user page, etc.) that the operating system needs to be deduplicated. In some embodiments, each operating system may identify a page type by utilizing a process ID field within a page table, as discussed in more detail below. In some embodiments, a hypervisor or operating system may use a table analogous to tables 422 and/or 422 of FIG. 4 to identify the page type, as discussed above.

Per block 604, if the first page is an active page, then the operating system may communicate that the first page is an active page to a hypervisor and the hypervisor scores the first page toward high priority. To "score" may mean to mark or provide a value for calculation purposes. For example, if the first page is an active page then the hypervisor may give the first page a value of 10 and any value above 10 may be considered high priority. The value of 10 in this example may be the threshold value at which the hypervisor determines that a page is high priority. The point at which a page is considered high priority may be any suitable value. In some embodiments, even though a page may surpass a high priority threshold, there may be varying levels of high priority and therefore varying levels of high scoring for priority calculation. For example, if a first page is a real time page (high priority) and a second page is a kernel page (high priority), even though both may be high priority pages, one of the pages (e.g., real time page) may be scored at an even higher priority than the other page. "High priority" (or high ranking page) may mean that the hypervisor deems the first page to be important enough such that the associated memory address directly attached to the processor (SRAD) that is accessing the first page is a strong candidate for deduplication. As discussed above, certain pages may take on a high priority given the importance of keeping a thread that accesses a page within a local physical memory.

Per block 606, the operating system may determine whether the first page is a kernel page. If the first page is a kernel page then the hypervisor may score or increment the first page toward high priority per block 608. To "increment" may mean to add to a score that was already deemed to be associated with a page that is high (or low) priority. For example, the first page can be both an active page and a kernel page. Accordingly, at block 602 for example, a high priority threshold value of 10 could have been assigned to the first page for being active. At block 606 the hypervisor may increment the score (i.e., add another 10 points) to give the first page even higher priority for being a kernel page.

If the first page is not a kernel page then, per block 610, the operating system may determine whether the first page is a real time page. If the first page is a real time page, then the hypervisor may score (or increment) the first page toward high priority per block 612. If the first page is not a real time page then, per block 614, the operating system may determine whether the first page belongs to an exclusive registry set (RSET). An exclusive RSET may be a defined set of resources that must be run in a particular way. An exclusive RSET may be derived from a registry service that enables system administrators (or systems) to define and name resource sets so that the resource sets can be used by other users or applications. Each RSET definition may have an owner (user ID), group (group ID), and access permissions associated with it. These may be specified at the time the RSET definition is created and exists for the purpose of access control. In an example illustration, an exclusive RSET may correspond to a processor (or cores) that only utilizes a particular set of memory pages for a particular set of applications. Accordingly, a processor may be dedicated only to specific applications. Therefore, if the first page is a part of an exclusive RSET, then the hypervisor may score (or increment) the first page toward high priority per block 616.

If the first page does not belong to an exclusive RSET then, per block 618, the operating system may determine whether the first page is a user page. If the first page is a user page then, per block 620, the hypervisor may score (or increment) the first page toward low priority (or not high priority). "Low priority" or any priority level that is not high priority may mean that the hypervisor deems the first page to not be important enough such that the associated memory address directly attached to the processor (SRAD) that is accessing the first page is a not strong candidate for deduplication.

If the first page is not a user page then, per block 622, the hypervisor may score (or increment) the first page toward low priority. For example, if the operating system determines that the first page is any other page type than the page types specified in the process 600, then the hypervisor may score the first page toward low priority.

Per block 624, after the hypervisor scores the priority level for the first page (e.g., blocks 602-622), then the hypervisor may calculate the first page total priority score and then compare the score to a second page priority score. In some embodiments, the hypervisor may also score a priority level for the second page type in a similar manner as specified in blocks 602-622. Calculating a priority score in some embodiments may be based on adding each of the values scored or incremented in blocks 604, 608, 612, 616 and 620. Accordingly, for example, the first page may have been an active page (10 points), a real time page (20 points) and belonged to an exclusive RSET (10) points. The final priority calculation score may therefore be 40 (20+10+10). In some embodiments more factors may be taken into consideration such as the memory bandwidth associated with a particular page, blocks 636 (discussed more below) and/or block 632 (discussed more below).

Per block 626, the hypervisor may then compare the first and second page priority scores and determine whether the priority scores differ. If one page scores is lower (or higher) in priority then, per block 628, the hypervisor may rank the pages with the higher priority scores higher than the lower priority score. To rank one page above or higher than another page as disclosed herein may mean to weight, score, and give preference to the memory address space belonging to the page that is ranked higher as a more likely candidate for deduplication. Accordingly, lower ranked pages for different SRADS may change a mapping to point to the memory address space that is directly attached to the processor (SRAD) that was originally accessing highest ranked page (e.g., deduplication according to FIGS. 4A and 4B). In an example illustration, the first page may be a real time page (scored as high priority) and the second page may be a user page (scored as low priority). The first page may therefore be ranked higher such that the first page's corresponding physical memory address will be a more likely candidate for storing data in a deduplication scheme. Accordingly, the second page will include a pointer value to the physical address corresponding with the first page such that an access of the second logical page will reference the physical address corresponding with the first logical page.

Per block 630, if the priority scores are the same or are not different, then the hypervisor may determine whether the first and second pages are the same page type. For example, the hypervisor may determine that both the first and second pages are kernel page types, which means that they are the same page type. Per block 632, if the first and second pages are the same page type, the hypervisor may determine which page is the LRU and rank accordingly. As discussed above, the LRU algorithm is based on that idea that pages that have been heavily used in the last few processes will likely be used again the next few processes. Conversely, pages that have not been used for a while will likely be unused for an extended period of time. Accordingly, if a page is the least recently used page then it may be unlikely to be used and if so if may be ranked lower. Alternatively, if a page has been recently used then it may be likely to be used again and if so it may be ranked higher. The LRU list is discussed in more detail below. In some embodiments, utilizing the LRU list may be utilized for ranking regardless of whether the priority scores are different between the first and second pages.

Per block 634, if the first and second pages are not the same page type, the hypervisor may dynamically rank each page. For example, the first page may be a kernel page and the second page may be a real time page both of which may be high priority pages. They hypervisor may dynamically rank each page by taking into account various other factors to make a final rank because a static calculating of a priority level may not be definitive for ranking purposes. In some embodiments, for example, block 630 may occur when a hypervisor determines a quantity of times each page has been accessed for a particular time span, and the page that has been accessed the most may be ranked higher. For example, within an hour time span, the first page may have been accessed 20 more times than the second page. Accordingly, the first page may be ranked higher. In some embodiments, the hypervisor may determine the quantity by utilizing a counter within a data structure. In some embodiments, determining which page is the LRU (block 632) may be utilized in addition or instead of the counter method described above to dynamically rank each page. In some embodiments, the operation in block 636 may be utilized in addition to or instead of both of the operations described above. Block 636 is discussed in more detail below.

Per block 636, after an initial ranking has occurred, the hypervisor may determine which SRAD(s) of the first and second page has the highest quantity of pages that will be deduplicated and adjust the rankings accordingly if needed. For example, the hypervisor may identify an SRAD where the first page is located and an SRAD where the second page is located, according to the methods described above.

Figure 7:
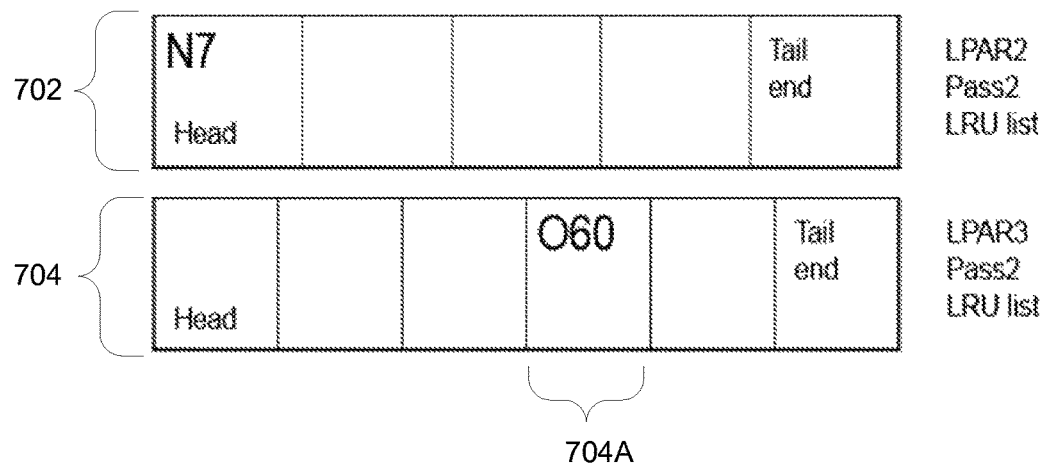
FIG. 7 is a block diagram of two Least Recently Used (LRU) lists illustrating how ranking of pages may occur, according to embodiments.

FIG. 7 is a block diagram of two LRU lists 702 and 704 illustrating how ranking of pages may occur, according to embodiments. The two LRU lists 702 and 704 may correspond to lists utilized by an LRU algorithm to determine a page ranking for deduplication purposes. As discussed above, the LRU algorithm is based on that idea that pages that have been heavily used in the last few processes will likely be used again the next few processes. Conversely, pages that have not been used for a while will likely be unused for an extended period of time. Accordingly, the LRU algorithm is based on purging and/or paging out pages that have been unused for a long time or particular quantity of time when a page fault occurs. Each LRU list (e.g., LRU lists 702 and 704) for every LPAR may include a "head" node (e.g., field), which is the position in which a particular page has been the most recently accessed. Conversely, the "tail end" is the node in which a particular page has been the least recently used or accessed. LRU lists may therefore be a spectrum of multiple nodes in between the head and the tail end that goes from the most recently used page to a least recently used page. The least recently used page may be the page most likely to be paged out to disk.

FIG. 7 illustrates that LRU list 702 belongs to LPAR2 (e.g., for SRAD1) and that LRU list 704 belongs to LPAR 3 (e.g., for SRAD2). Further, both LRU lists are in Pass2. Pass1 and Pass2 may be time identifiers utilized by a hypervisor to determine how long a particular page has been stored to memory to determine when page stealing may occur and paging out. For example, in Pass1, pages may not be ready for page stealing yet because the page has not been stored for a particular quantity of time. Page stealing may be an operation that takes a page that is assigned for a first process and makes it available for another process. After a threshold period of time, the pages may be considered to be in Pass2, which means that pages may now be able to be stolen and the LRU page may be stolen.

Pages N7 and O60 may be the same page type (e.g., kernel pages) so ranking these pages for deduplication purposes may be determined by the positioning of each page in each of the respective LRU lists 702 and 704 in some embodiments. FIG. 7 illustrates that that page N7 is within the "head" node of LRU list 702. Conversely, page O60 is within the node 704A, which is only 2 nodes away from the tail end and 3 nodes away from the head. Accordingly, page O60 within LPAR3 may be more likely to be stolen assuming an equal length LRU list. Therefore, page N7 may be ranked higher because it is less likely to be stolen.

In some embodiments, determining what field or position a page is in within an LRU list is done by calculating the percentage distance a page is from the tail end. This may be done, for example, by taking a position of a page and dividing it by the number of total nodes within an LRU list. For example, for page O60 within LRU list 704, the position of the page is O60 and the total number of nodes may be 200. Accordingly, page O60 may be in the $60^{th}$ position from the tail page and thus be in a position that is 30% close to the tail end node (i.e., 60/200=0.3). The percentage distance may be utilized in some embodiments because simply taking how many nodes or fields a page is from a tail end may not take into account the LRU list lengths in different LPARs based on the memory assigned to them (corresponding to the total number of nodes in an LRU list).

In some embodiments, when an LRU list size (e.g., number of nodes) is considered, Dynamic Reconfiguration (DR), and Dynamic Logical Partitioning (DLPAR)) is taken into account. DR is the process of enabling resources to be added or removed while an operating system is running. DLPAR is an operation that allows an application to dynamically allocate additional resources (e.g., memory and CPUs) to each logical partition, if needed, without stopping the application. DLPAR operations may utilize Live Partition Mobility (LPM) operations that allow a particular LPAR to be relocated or migrated from one system (e.g., SRAD, server, etc.) to another. In these situations a user may request a DR in order to remove or add particular CPUs or memory from a first LPAR to a second LPAR within a different SRAD. If the removing or adding of resources from LPARs occurs, then more or less nodes may be added or subtracted to each LRU list, which may change calculations for determining how far a page is from a tail end.

In some embodiments, DR operations (including LPAR and LPM) may be configured into a final ranking of pages for deduplication purposes. For example, a first page may be ranked the highest in order to deduplicate data to the address space that is local to the processor accessing the first page. However, the first page may be subject to a DR request, which may mean that the processor and memory that was originally associated with the first page may be migrated. In this case, a new highest ranked page (or primary page) may be chosen consistent with methods disclosed herein for deduplication because the first page used to be local to the process accessing the first page, but may now be remote. In some embodiments, in order to preserve the corrections or page deduplication selections based on ranking as disclosed herein, the DR operations may be nullified (i.e., not succeed) if the DR operation includes a page that is the primary page (highest ranked page) utilized for deduplication. Accordingly, the processor and/or memory to which the page belongs may not be migrated such that the integrity of the page ranking for deduplication may be maintained.

Figure 8:
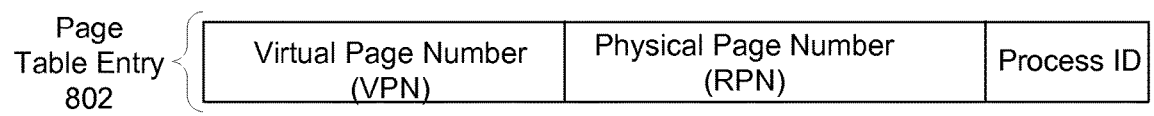
FIG. 8 is a block diagram of an example page table entry that illustrates how a page type may be determined, according to embodiments.

FIG. 8 is a block diagram of an example page table entry that illustrates how a page type may be determined, according to embodiments. FIG. 8 includes a page table entry 802. The page table entry 802 may be part of a page table that maps a given virtual address to real address. The page table entry 802 may include a Virtual Page Number (VPN) bit field, a Physical Page Number (RPN) bit field, and a Process ID bit field. In some embodiments, the page table entry 802 may include more bit fields than illustrated in FIG. 8 (e.g., protection bits, valid bits, dirty bits, referenced bits, etc.). In some embodiments, the process ID bit field may be included in other data structures, such as in a hypervisor logical memory map as opposed to a page table.

In some embodiments, the process ID bit field may identify and keep track of which process or thread accesses or is currently accessing the corresponding page. For example, the page table entry 802 may include a first VPN that includes a pointer value to map the first VPN to a first RPN. The operating system may then determine that for the first RPN a real time thread is currently accessing the first RPN via the current process ID bit field. Therefore, the operating system may identify the first RPN as a real time page and communicate this information with the hypervisor.

In some embodiments, the hypervisor may determine the process that is accessing a particular page via a shared memory operation, such as shmat. Shmat attaches a shared memory segment (a shmid) to the address space of the calling process. Accordingly, the hypervisor may scan a particular shmid of a particular address space in order to identify the process that is accessing the data within the particular address space.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for prioritizing data access within a deduplicated environment, the method comprising:
   identifying, by a computing device, a page type for each memory page of a plurality of memory pages, the page type corresponding to a particular process that accesses a particular memory page of the plurality of memory pages, the plurality of memory pages each respectively including duplicate data, the duplicate data being a same set of data values, the computing device including two or more processors, each processor of the two or more processors directly attached to a different memory device;
   ranking, by the computing device, each of the plurality of respective memory pages as candidates to deduplicate the set of data values to, the ranking based on at least the page type;
   identifying, based on the ranking and by the computing device, a first processor of the two or more processors that accesses a highest ranked memory page of the plurality of memory pages, and identifying a first memory device that the memory page is located in, the first memory device directly attached to the first processor; and
   deduplicating, in response to the identifying the first processor and the identifying the first memory device, the duplicate data from the plurality of memory pages to the highest ranked memory page, the deduplicating corresponding to coalescing the duplicate data to the highest ranked memory page.

2. The method of claim 1, wherein the ranking includes:
   determining that two or more memory pages of the plurality of respective memory pages are located within a Least Recently Used (LRU) list, the LRU list corresponding to a list of memory pages that will be paged out according to how recent each of the list of memory pages was last accessed;
   determining that a first memory page of the two or more memory pages was accessed more recently than a second memory page of the two or more memory pages within the LRU list; and
   ranking the first memory page higher than the second memory page, the ranking based on the determining that a first memory page of the two or more memory pages was accessed more recently than the second memory page.

3. The method of claim 1, wherein the identifying a page type includes:
   accessing a page table entry of a page table, the page table entry corresponding to one of the plurality of respective memory pages, the page table entry including a first virtual page number (VPN) that is mapped to a first Physical Page Number (RPN), the page table entry including a field that specifies an identification of a first process that is currently accessing the RPN; and identifying the page type by reading the field that specifies the identification of the first process that is currently accessing the RPN.

4. The method of claim 1, wherein the ranking includes:
determining that a first set of memory pages of the plurality of memory pages belong to an exclusive registry set (RSET), the exclusive RSET corresponding to a processor of the two or more processors that only accesses the first set of memory pages;
determining that a second set of memory pages of the plurality of respective memory pages do not belong to the exclusive RSET; and
ranking, in response to the determining that a first set of memory pages of the plurality of respective memory pages belong to an exclusive RSET, the first set of memory pages higher than the second set of memory pages.

5. The method of claim 1, wherein the first processor and the first memory device form a first Scheduler Resource Affinity Domain (SRAD) of a plurality of SRADs, the first SRAD corresponding to a logical identification for the first processor and the first processor's directly attached first memory device, the method further comprising:
determining that the first SRAD is associated with a higher quantity of pages that include the duplicate data than a second SRAD of the plurality of SRADs, the first SRAD associated with a first memory page and the second SRAD associated with a second memory page; and
ranking, based on the determining that the first SRAD is associated with a higher quantity of pages that include the duplicate data than a second SRAD, the first memory page higher than the second memory page.

6. The method of claim 1, wherein the ranking includes:
determining that a first memory page of the plurality of memory pages is a kernel page type, the kernel page corresponding to a page that is accessed from a process that runs at least a portion of a kernel of an operating system;
determining that a second memory page of the plurality of memory pages is a user page type, the user page corresponding to an application page that is part of a program that excludes the kernel;
ranking, based on the determining that the first memory page is a kernel page type and based on the determining that the second memory page is a user page type, the first memory page higher than the second memory page.

7. The method of claim 1, wherein the ranking includes:
determining that a first memory page of the plurality of memory pages is a real-time page type;
determining that a second memory page of the plurality of memory pages is a user page type, the user page corresponding to an application page that is part of a program;
ranking, based on the determining that the first memory page is a real-time page type and based on the determining that the second memory page is a user page type, the first memory page higher than the second memory page.

8. A system for prioritizing data access within a deduplicated environment, the system comprising:
a computing device having two or more processors, each of the two or more processors directly attached to a different memory device; and
a computer readable storage medium having program instructions embodied therewith, the program instructions executable by the two or more processors to cause the system to:
identify a page type for each memory page of a plurality of memory pages, the page type corresponding to a particular process that accesses a particular memory page of the plurality of memory pages, the plurality of memory pages each respectively including duplicate data, the duplicate data being a same set of data values;
rank each of the plurality of respective memory pages as candidates to deduplicate the set of data values to, the ranking based on at least the page type;
identify, based on the ranking, a first processor of the two or more processors that accesses a highest ranked memory page of the plurality of memory pages, and identifying a first memory device that the memory page is located in, the first memory device directly attached to the first processor; and
deduplicate, in response to the identifying the first processor and the identifying the first memory device, the duplicate data from the plurality of memory pages to the highest ranked memory page, the deduplicating corresponding to coalescing the duplicate data to the highest ranked memory page.

9. The system of claim 8, wherein the ranking includes:
determining that two or more memory pages of the plurality of respective memory pages are located within a Least Recently Used (LRU) list, the LRU list corresponding to a list of memory pages that will be paged out according to how recent each of the list of memory pages was last accessed;
determining that a first memory page of the two or more memory pages was accessed more recently than a second memory page of the two or more memory pages within the LRU list; and
ranking the first memory page higher than the second memory page, the ranking based on the determining that a first memory page of the two or more memory pages was accessed more recently than the second memory page.

10. The system of claim 8, wherein the identifying a page type includes:
accessing a page table entry of a page table, the page table entry corresponding to one of the plurality of respective memory pages, the page table entry including a first virtual page number (VPN) that is mapped to a first Physical Page Number (RPN), the page table entry including a field that specifies an identification of a first process that is currently accessing the RPN; and
identifying the page type by reading the field that specifies the identification of the first process that is currently accessing the RPN.

11. The system of claim 8, wherein the ranking includes:
determining that a first set of memory pages of the plurality of memory pages belong to an exclusive registry set (RSET), the exclusive RSET corresponding to a processor of the two or more processors that only accesses the first set of memory pages;
determining that a second set of memory pages of the plurality of respective memory pages do not belong to the exclusive RSET; and
ranking, in response to the determining that a first set of memory pages of the plurality of respective memory pages belong to an exclusive RSET, the first set of memory pages higher than the second set of memory pages.

12. The system of claim 8, wherein the first processor and the first memory device form a first Scheduler Resource Affinity Domain (SRAD) of a plurality of SRADs, the first SRAD corresponding to a logical identification for the first processor and the first processor's directly attached first memory device, the program instructions executable by the two or more processors further cause the system to:
  determine that the first SRAD is associated with a higher quantity of pages that include the duplicate data than a second SRAD of the plurality of SRADs, the first SRAD associated with a first memory page and the second SRAD associated with a second memory page; and
  rank, based on the determining that the first SRAD is associated with a higher quantity of pages that include the duplicate data than a second SRAD, the first memory page higher than the second memory page.

13. The system of claim 8, wherein the ranking includes:
  determining that a first memory page of the plurality of memory pages is a kernel page type, the kernel page corresponding to a page that is accessed from a process that runs at least a portion of a kernel of an operating system;
  determining that a second memory page of the plurality of memory pages is a user page type, the user page corresponding to an application page that is part of a program that excludes the kernel;
  ranking, based on the determining that the first memory page is a kernel page type and based on the determining that the second memory page is a user page type, the first memory page higher than the second memory page.

14. The system of claim 8, wherein the ranking includes:
  determining that a first memory page of the plurality of memory pages is an active page type, the active page type corresponding to a process that is currently running on one of the two or more processors;
  determining that a second memory page of the plurality of memory pages is a user page type, the user page corresponding to an application page that is part of a program;
  ranking, based on the determining that the first memory page is an active page type and based on the determining that the second memory page is a user page type, the first memory page higher than the second memory page.

15. A computer program product comprising a computer readable storage medium having program instructions embodied therewith, the program instructions executable by a computing device to cause the computing device to perform a method, the method comprising:
  identifying a page type for each memory page of a plurality of memory pages, the page type corresponding to a particular process that accesses a particular memory page of the plurality of memory pages, the plurality of memory pages each respectively including duplicate data, the duplicate data being a same set of data values, the computing device including two or more processors, each processor of the two or more processors directly attached to a different memory device;
  ranking, by the computing device, each of the plurality of respective memory pages as candidates to deduplicate the set of data values to, the ranking based on at least the page type;
  identifying a first processor of the two or more processors that accesses a highest ranked memory page of the plurality of memory pages, and identifying a first memory device that the memory page is located in, the first memory device directly attached to the first processor; and
  deduplicating, based on the ranking, the duplicate data from the plurality of memory pages to the highest ranked memory page, the deduplicating corresponding to coalescing the duplicate data to the highest ranked memory page.

16. The computer program product of claim 15, wherein the ranking includes:
  determining that two or more memory pages of the plurality of respective memory pages are located within a Least Recently Used (LRU) list, the LRU list corresponding to a list of memory pages that will be paged out according to how recent each of the list of memory pages was last accessed;
  determining that a first memory page of the two or more memory pages was accessed more recently than a second memory page of the two or more memory pages within the LRU list; and
  ranking the first memory page higher than the second memory page, the ranking based on the determining that a first memory page of the two or more memory pages was accessed more recently than the second memory page.

17. The computer program product of claim 15, wherein the identifying a page type includes:
  accessing a page table entry of a page table, the page table entry corresponding to one of the plurality of respective memory pages, the page table entry including a first virtual page number (VPN) that is mapped to a first Physical Page Number (RPN), the page table entry including a field that specifies an identification of a first process that is currently accessing the RPN; and
  identifying the page type by reading the field that specifies the identification of the first process that is currently accessing the RPN.

18. The computer program product of claim 15, wherein the ranking includes:
  determining that a first set of memory pages of the plurality of memory pages belong to an exclusive registry set (RSET), the exclusive RSET corresponding to a processor of the two or more processors that only accesses the first set of memory pages;
  determining that a second set of memory pages of the plurality of respective memory pages do not belong to the exclusive RSET; and
  ranking, in response to the determining that a first set of memory pages of the plurality of respective memory pages belong to an exclusive RSET, the first set of memory pages higher than the second set of memory pages.

19. The computer program product of claim 15, wherein the first processor and the first memory device form a first Scheduler Resource Affinity Domain (SRAD) of a plurality of SRADs, the first SRAD corresponding to a logical identification for the first processor and the first processor's directly attached first memory device, the method further comprising:

determining that the first SRAD is associated with a higher quantity of pages that include the duplicate data than a second SRAD of the plurality of SRADs, the first SRAD associated with a first memory page and the second SRAD associated with a second memory page; and ranking, based on the determining that the first SRAD is associated with a higher quantity of pages that include the duplicate data than a second SRAD, the first memory page higher than the second memory page.

20. The computer program product of claim 15, wherein the ranking includes:

determining that a first memory page of the plurality of memory pages is a kernel page type, the kernel page corresponding to a page that is accessed from a process that runs at least a portion of a kernel of an operating system;

determining that a second memory page of the plurality of memory pages is a user page type, the user page corresponding to an application page that is part of a program that excludes the kernel;

ranking, based on the determining that the first memory page is a kernel page type and based on the determining that the second memory page is a user page type, the first memory page higher than the second memory page.

* * * * *